G. ATTERBURY.
ARTIFICIAL STONE.
APPLICATION FILED OCT. 30, 1912.
1,140,559.  Patented May 25, 1915.
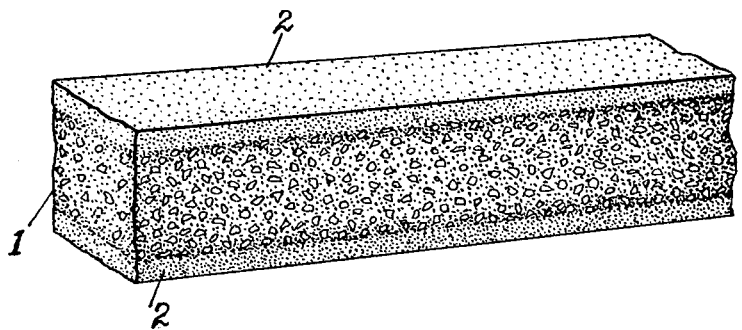

UNITED STATES PATENT OFFICE.

GROSVENOR ATTERBURY, OF NEW YORK, N. Y.

ARTIFICIAL STONE.

1,140,559. Specification of Letters Patent. Patented May 25, 1915.

Application filed October 30, 1912. Serial No. 728,683.

*To all whom it may concern:*

Be it known that I, GROSVENOR ATTERBURY, a citizen of the United States, residing in the city, county, and State of New York, have invented or discovered certain new or useful Improvements in Artificial Stone, of which the following is a full, clear, and complete disclosure.

My invention more particularly relates to improvements in hydraulic cement compositions used for building purposes.

One of the chief difficulties in using concrete for building purposes is the inability to drive nails, screws, etc., into it.

One object of my invention is to overcome this difficulty and to produce a cement or concrete composition which will be relatively strong and hard and yet so constituted that it will receive and firmly hold tacks, nails and screws which may be driven into it in a like manner as into wood.

A further object is to produce a composition of this kind of inexpensive materials which will readily unite with ordinary hydraulic cement compositions and form a strong bond.

A still further object is to produce a composition of this kind entirely of mineral materials which will not be liable to disintegrate when subjected to moisture or heat, or expand and contract from the same causes.

In practising my invention I form a mixture of hydraulic cement, sand and a material known in the trade as rock asbestos, the latter being the tailings obtained from the manufacture of commercial asbestos. Rock asbestos differs from commercial asbestos in that while the latter is mainly formed of fibers, the former is composed of a mixture of minute particles of rock with the stub ends of asbestos fibers adhering thereto, and of detached short asbestos fibers.

The three ingredients above specified are thoroughly mixed with the addition of sufficient water to cause the cement to set. I have found a mixture consisting by volume of one part of cement, two parts of sand and two parts of rock asbestos to give very satisfactory results. The proportions of the ingredients, however, may be varied within wide limits. Also, the sand may be omitted, but this is not in general advisable as it makes the resulting composition more expensive. Crushed rock or cinders, may, if desired, be added to the sand, cement and rock asbestos, or may be employed as a substitute for the sand, but when used it should be finely crushed as the presence of large particles of rock would materially interfere with the use of the composition to receive nails, screws, etc.

With a mixture having one part cement, two parts sand and two parts rock asbestos, all by volume, a product is produced having only about 60% of the specific gravity of the average concrete. Nails can be driven into the material after it has set, almost as easily as into wood, and the grip of material on the nails is sufficiently strong for all practical purposes. Moreover, the composition has considerable tensile strength and does not fracture when nails are driven therein.

The material referred to above as "rock asbestos" is also known locally by other names, such as "rough asbestic," and it usually consists by weight of 70 to 90% of finely crushed rock, about the size of the sand commonly used in concrete mixtures, and 10 to 30% of short asbestos fiber, together with a certain quantity of very fine particles of asbestos in the form of sand, grit or powder. At some mines the practice is to screen out most, if not all, of the rock and then to market the short fibers as a separate product. In practising my invention, it is sometimes advantageous, where freight rates are high from the asbestos mines, to use this screened-out fiber or lint, sometimes called fiber "E," but where it is thus used, it is necessary to include in the nailing composition an additional amount of sand or its equivalent to make up for the finely crushed rock screened out at the mines.

In the drawing accompanying and forming a part of this specification I have illustrated one application of my improved composition. The single figure of this drawing shows a concrete form having a body portion 1 formed of an ordinary composition of hydraulic cement, sand and crushed stone and faced on two sides with layers 2, of my improved composition. In making a form of this kind, when the two compositions are placed in the mold and allowed to harden simultaneously, the bond between them is practically perfect, and the form has substantially as much strength as if made homogeneous.

The illustration shows only one of the many applications of my improved composition which may be used as a facing, or as an inlay for concrete work of many kinds, wherever, in fact, it is desired to give the concrete a facing adapted to receive nails, screws, etc. Moreover, the ingredients of the composition are so inexpensive that solid slabs may be cast of it to be used as partitions, and forms of various kinds can be made for building purposes.

While the composition is specifically adapted for use for building purposes, it is because of its strength, hardness and heat insulating properties, suitable for many other uses.

Having now described my invention, what I claim is:

1. An artificial stone comprising cement and asbestos tailings and having a specific gravity substantially less than the average concrete mixture, and a texture such that nails, screws and tacks may be driven therein, substantially as described.

2. An artificial stone comprising cement and asbestos tailings, a filler and having a specific gravity substantially less than the average concrete mixtures, and a texture such that nails, screws and tacks may be driven therein, substantially as described.

3. An artificial stone comprising cement and asbestos tailings in the proportions substantially as specified.

4. An artificial stone, comprising cement and asbestos tailings, in which the amount of asbestos tailings exceeds in volume the amount of cement, substantially as described.

5. An artificial stone, comprising cement, a filler, and asbestos tailings, in which the amount of asbestos tailings exceeds in volume the amount of cement, substantially as described.

6. An artificial stone, comprising cement, a finely crushed filler, and asbestos tailings, in which the amount of asbestos tailings exceeds in volume the amount of cement, substantially as described.

7. An artificial stone, comprising cement, sand, and asbestos tailings, in which the amount of asbestos tailings exceeds in volume the amount of cement, substantially as described.

8. An artificial stone, consisting by volume of one part hydraulic cement, two parts filler, and two parts asbestos tailings, substantially as described.

9. An artificial stone, consisting by volume of one part hydraulic cement, two parts finely crushed filler, and two parts asbestos tailings, substantially as described.

10. An artificial stone, consisting by volume of one part hydraulic cement, two parts sand, and two parts asbestos tailings, substantially as described.

GROSVENOR ATTERBURY.

Witnesses:
FREDERICK E. TAPPAN,
JOSEPH P. MARSHALL.